United States Patent [19]
Schanz et al.

[11] Patent Number: 5,212,708
[45] Date of Patent: May 18, 1993

[54] AXIAL FLOW GAS LASER PARTICULARLY HIGH-POWER $CO_2$ LASER WITH DC EXCITATION

[75] Inventors: Klaus Schanz, Reinbek; Wolfgang Wurst, Hamburg, both of Fed. Rep. of Germany

[73] Assignee: Rofin-Sinar Laser GmbH, Hamburg, Fed. Rep. of Germany

[21] Appl. No.: 529,936

[22] Filed: May 29, 1990

[30] Foreign Application Priority Data

Nov. 29, 1989 [DE] Fed. Rep. of Germany ... 8914097[U]

[51] Int. Cl.$^5$ ............................................... H01S 3/22
[52] U.S. Cl. ....................................... 372/55; 372/61; 372/87
[58] Field of Search .................. 372/55, 58, 61, 65, 372/92, 93, 97, 98, 108, 87

[56] References Cited

U.S. PATENT DOCUMENTS

| | | | |
|---|---|---|---|
| 3,928,816 | 12/1975 | Hartwick et al. | 372/55 X |
| 4,573,162 | 2/1986 | Bakowsky et al. | 372/61 |
| 4,610,014 | 9/1986 | Martinen et al. | 372/59 |
| 4,617,667 | 10/1986 | Penn | 372/61 X |
| 4,825,445 | 4/1989 | Koop et al. | 372/61 |
| 5,043,995 | 8/1991 | Lackner | 372/58 X |
| 5,048,046 | 9/1991 | Welsch et al. | 372/61 X |
| 5,115,439 | 5/1992 | Howard | 372/55 X |
| 5,151,916 | 9/1992 | Iehisa et al. | 372/55 X |

Primary Examiner—Brian Healy
Attorney, Agent, or Firm—Herbert L. Lerner; Laurence A. Greenberg

[57] ABSTRACT

In an axial flow gas laser, in particular a high-power $CO_2$ laser with DC excitation, at least one discharge tube (1) of dielectric material, in particular quartz glass, is provided. First and second connection bodies (E1, E2) are sealingly connected to the discharge tube (1) or to connection necks branching off from it, in each case in the vicinity of an electrical and laser gas connection point, forming a connection chamber (K1, K2), and are connected to laser gas inlet lines (4) or outlet lines (9). The first connection body (E1) is connected to the anode potential and the second connection body (E2) to the cathode potential of a direct voltage source. The first and second connection bodies (E1, E2) are disposed with tubular axial spacing from one another, so that the discharge tube (1), with its gas chamber, forms a discharge path between the anode and cathode potentials. In accordance with the invention, the discharge tube (1) is provided over an axial portion of its jacket, which is located inside the connection chamber (K1) of the first connection body (E1), with at least one gas inflow opening (2). An electrode pin (6) the tip (6a) of which extends up to a point shortly before or in the wall region of the gas inflow opening (2) is inserted into the wall of the first connection body (E1).

9 Claims, 3 Drawing Sheets

AXIAL FLOW GAS LASER PARTICULARLY HIGH-POWER CO2 LASER WITH DC EXCITATION

BACKGROUND OF THE INVENTION

Field of the Invention

The invention relates to an axial flow gas laser, particularly a high-power $CO_2$ laser with DC excitation, having at least one discharge tube of dielectric material and having first and second connection bodies, which sealingly communicate with the discharge tube, or with the connection neck branching off from it, in either case in the region of an electrical and laser gas connection point, forming a connection chamber, and are connected to laser gas inlet or outlet lines, wherein the first connection body is connected to the anode potential and the second connection body is connected to the cathode potential of a direct voltage source, and the first and second connection bodies are disposed with a tubular axial spacing with respect to one another, so that the discharge tube with its gas chamber forms a discharge path between the anode and cathode potentials.

As high-power $CO_2$ lasers, such gas lasers have a fast axial flow of laser gas through them; they are embodied in particular with direct current (DC excitation), and they require a turbulent gas flow for stabilization of the gas discharge. In the production of the turbulent gas flow in the discharge path, the resonator geometry and the physics of the gas discharge must be taken into account; previously this required the production of complicated, expensive discharge tubes. These are predominantly quartz glass tubes, which are made by hand and flared at one end. A lateral inlet is often fused in on the opposite end, and into this inlet a nozzlelike body encompassing an electrode tip bent at a right angle and made of a tungsten alloy, a turned brass part for contacting and retaining it, and a ceramic body that surrounds the electrode tip are introduced in the form of an insert. The nozzlelike body is pressed against the seat faces of the lateral inlet by means of a helical compression spring and by a turned part. This arrangement is sealed in particular with a silicon hose, which is slipped over the outside onto the formed-on glass neck of the lateral inlet. This embodiment necessitates the fusing on of a glass neck to form the lateral inlet on the discharge tube, as well as the production, assembly and adjustment of a plurality of precision parts.

The object of the invention is to reduce the aforementioned production and assembly expense, or in other words to devise an axial flow gas laser, in particular a high-power $CO_2$ laser with DC excitation, in which manually fusing on a quartz glass neck or the like to form connection bodies is unnecessary, so that the laser gas inlet line for forming a turbulent gas flow and the electrical connection can be achieved in a simpler manner that before. The intrinsically advantageous generation of the electrical field in the discharge tube by means of an electrode tip, however, should be maintained.

SUMMARY OF THE INVENTION

According to the invention, this object is attained in a gas laser as defined by the preamble to claim 1 in that the discharge tube, over an axial portion of its jacket that is located inside the connection chamber of the first connection body, is provided with at least one gas inflow opening, and that an electrode pin, the tip of which extends to a point shortly before or in the wall region of the gas inlet opening, is inserted into the wall of the first connection body.

Advantageous further features of the subject of claim 1 are defined by claims 2-8. According to claim 2, the electrode pin is disposed coaxially with the axis of the gas inflow opening. It is also favorable if in accordance with claim 3, a gas inlet line discharges into the connection chamber on the side of the first connection body opposite the gas inflow opening. This enables increasing the turbulence of the gas flow, because the partial gas flows from two semi-annular chamber spaces converge in the vicinity of the electro pin and of the gas inflow opening.

The first connection body preferably comprises metal and forms an electrode body. The first connection body is embodied in particular as a turned part or in other words is rotationally symmetrical, which then is subsequently provided with the bores for the gas inlet line and the electrode pin. The embodiment of claim 6 is particularly favorable, in which the anode pin is retained adjustably in terms of its insertion depth and in a sealed manner in an insert part of the connection body. The insert part can for instance be embodied as an insert liner that is sealingly connected to the jacket wall of the insert body, for instance by soldering or welding.

Together with the embodiment of the voltage supply and gas inlet line in the vicinity of the first connection body, an embodiment of the second connection body in accordance with claim 7 has proved to be particularly advantageous; in it, the discharge tube discharges by its open end into the connection chamber of the second connection body, and an annular cathode is retained in the second connection body, coaxially with and axially spaced apart from the discharge tube. Instead of an annular cathode, it is in principle also possible, as in claim 8, for the discharge tube to discharge by its open end into the connection chamber of the second connection body, and for a cathode pin to extend inside the connection chamber parallel to the axis of the discharge tube up to the vicinity of its end, and for the connection chamber to be reduced in its inside diameter in stages along the flow path between the discharge tube and the gas outlet conduit.

The primary advantages attainable with the invention can be summarized as follows:

- all the metal parts can be manufactured simply and inexpensively as parts made on an automatic lathe;
- the discharge tube can be manufactured in a simple manner at favorable cost without requiring a glass-blower;
- the positioning of the electrode tip, in particular the anode tip, with respect to the nozzle opening is uncritical in comparison with previously known versions;
- in contrast to the previously known embodiment described at the outset, the symmetry of the gas flow is not disturbed by the electrode tip;
- a nozzle-like inflow gas opening is formed by the bore.

First, an embodiment in accordance with the prior art will be described below, and then a plurality of exemplary embodiments of the invention, referring to the drawing. Shown in the drawing are:

DESCRIPTION OF THE PREFERRED EMBODIMENTS

Figure 1:
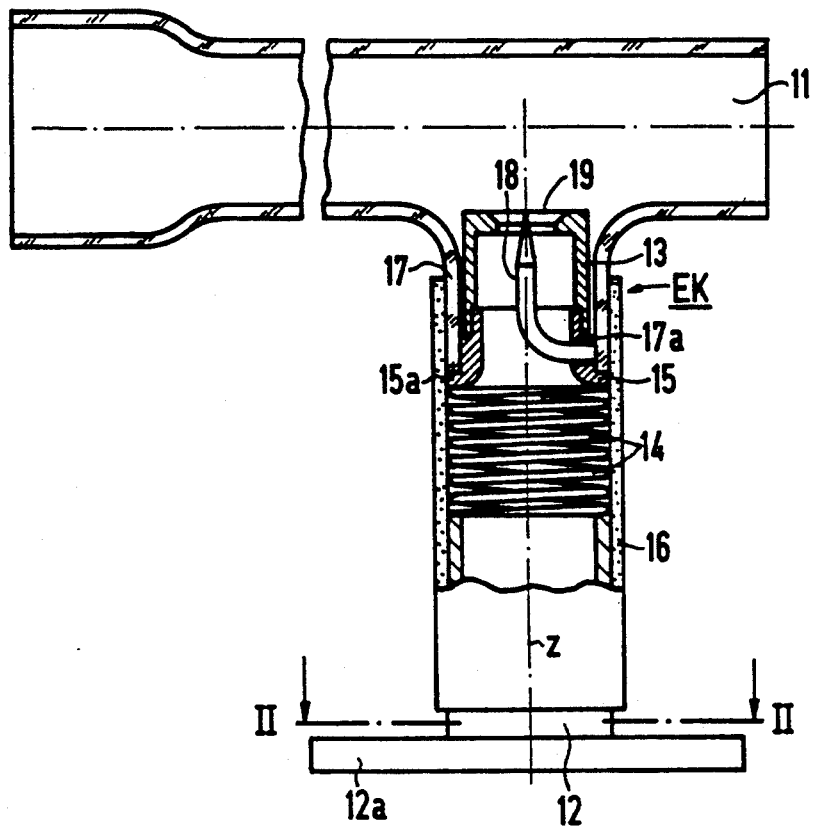
FIG. 1, a part, partially in section, of the discharge tube of a $CO_2$ gas laser with a fused-on inlet neck and an insert part introduced into it.

The known embodiment of a discharge tube shown in FIG. 1 has a quartz tube 11 made by hand, shown in part, which is flared at one end (the left-hand end is shown). At the opposite end of the quartz tube 11, a lateral inlet neck 17 is fused in, into which a nozzlelike insert body EK is inserted. This body comprises an electrode tip 18 bent at an angle, an approximately cup-shaped ceramic body 13 and a sleevelike turned brass part 15 with a flange 15a. The electrode tip 18 is inserted into a bore in the reinforced jacket region of the turned brass part 15 and accordingly extends initially radially and then radially/axially at the bend and then coaxially with the axis z-z of the inlet neck 17 or centrally to the bore 19 which is disposed in the bottom of the ceramic body 13. The bore 19 is nozzlelike, because in the gas flow direction (the inlet neck is a gas inlet neck 17) it initially narrows down to a narrowest cross section, and then widens again. The electrode tip 18 preferably comprises a tungsten alloy; it is connected to the anode potential of the high-voltage direct current source, not shown. The turned brass part 15 with the electrode tip 18 introduced fits precisely, with its tapered end, into the seat faces on the inner circumference of the ceramic body 13, and the parts 13, 15 and 18 which form a gas inlet nozzle are pressed, as an insert part, against the seat faces 17a on the inlet neck 17, by means of a helical compression spring 14 via a turned part 12 having an annular flange 12a. A silicon hose 16 is slipped over the gas inlet neck 13, helical compression spring 14 and shaft of the turned part 12 and by elastic deformation seals off the gaps and interstices located in its interior, as shown in FIG. 1, from the outside in a gas-tight manner. The annular flange 12a is used for connection of a gas inflow line, not shown, and for connection to an electrode carrying the anode potential of the high-voltage direct current source.

Figure 2:
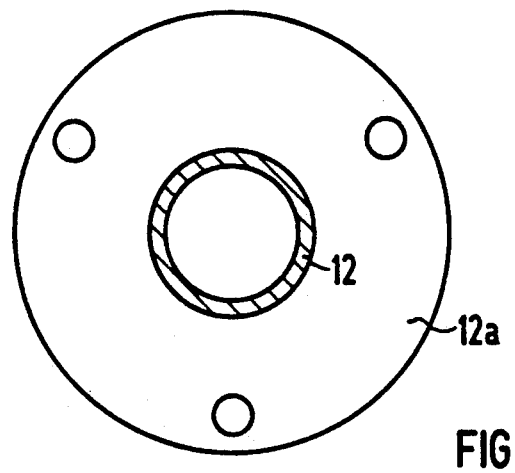
FIG. 2, a section along the plane II—II of FIG. 1.

In comparison with the known embodiment of FIGS. 1 and 2, a simplification of manufacture and assembly of the gas laser is attained by means of the invention, along with an improvement in function, as will be described below in conjunction with FIGS. 3-5.

Figure 3:
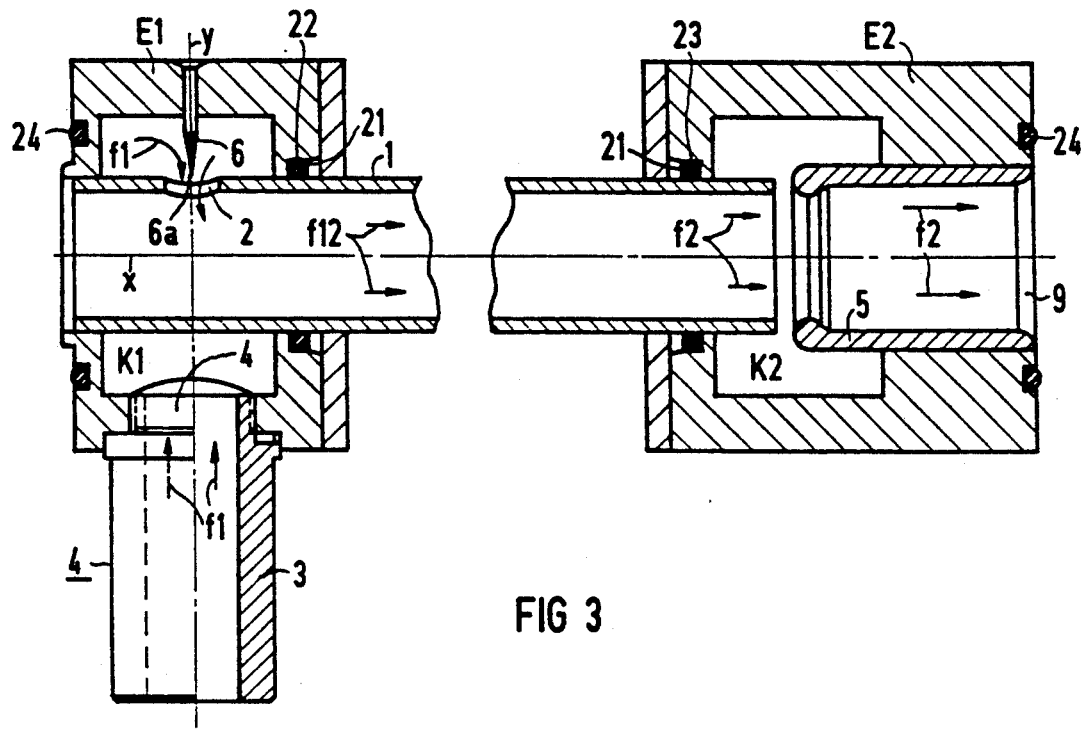
FIG. 3, in a part of an individual discharge path, a section through the associated discharge tube and the two first and second connection bodies, disposed on both ends, of a gas laser, in particular a $CO_2$ gas laser with DC excitation.

The discharge tube 1 of FIG. 3 is a standard quartz tube or a general-purpose glass tube. The length of the discharge tube may for instance typically be from 200 to 300 mm, with a diameter of 10 to 30 mm (depending on the laser type). FIG. 5 shows that a plurality of such discharge tubes 1, connected optically in series, can form the resonator R of a $CO_2$ gas laser.

Figure 5:
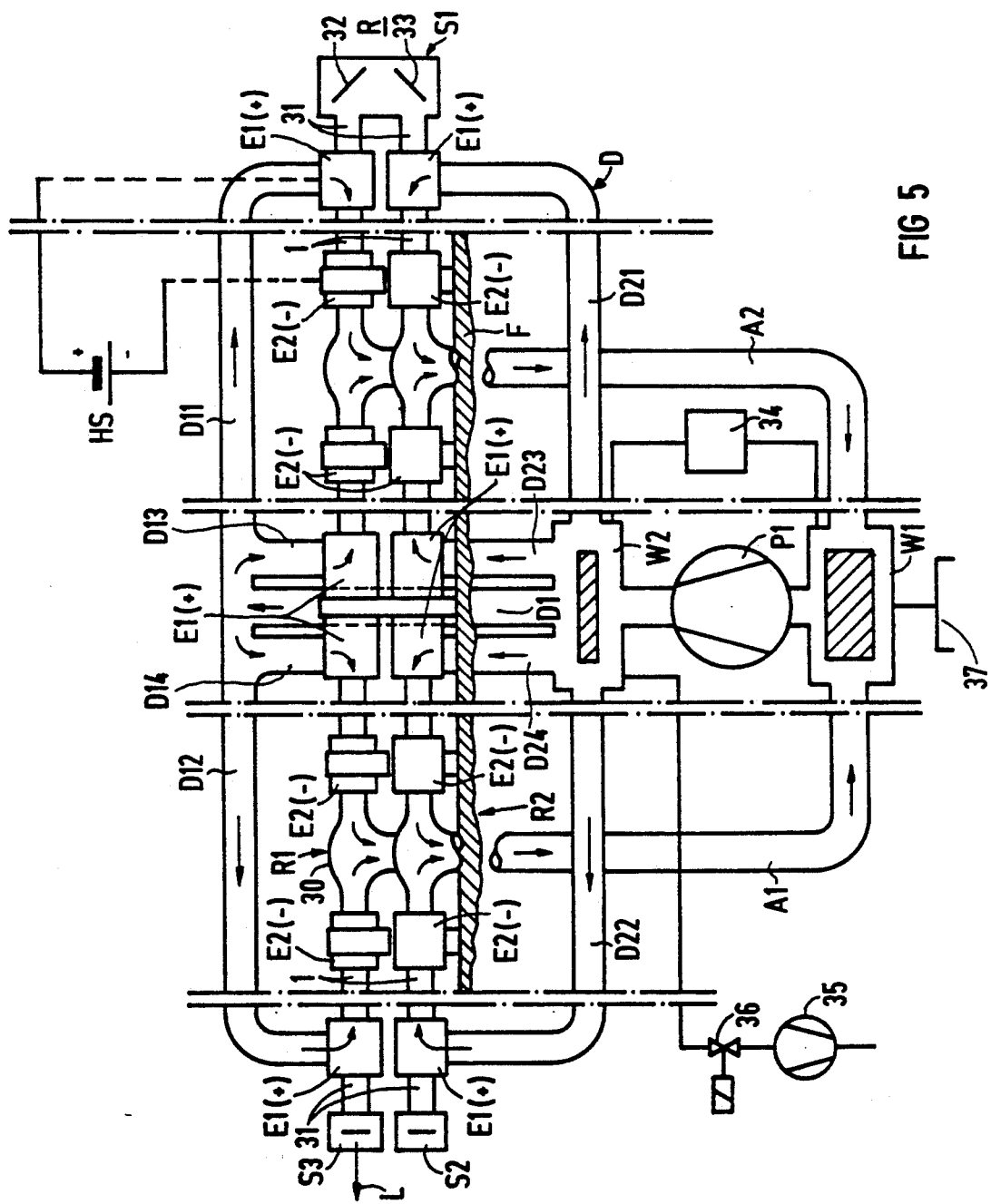
FIG. 5, in a schematic overview, an axial flow high-power $CO_2$ laser with DC excitation, the resonator of which is singly folded and in which four discharge tubes of FIG. 3 or FIG. 4 per resonator half are connected in series.

In FIG. 5, the resonator R is singly folded and has four discharge tubes 1 per resonator half R1 or R2. This is a gas laser, in particular a high-power $CO_2$ laser, the discharge tube 1 of which (compare FIGS. 1 and 5) is supplied with the laser gas as indicated by the gas flow arrows f1, and the flow of laser gas through the discharge tube 1 is axial and turbulent, with a high flow speed (flow arrows f12), and the laser gas leaves the discharge tube 1 as indicated by the outflow arrows f2 and in so doing follows its path through the connection chamber K2 of the second connection body E2 and through the (hollow) annular cathode 5. The discharge tube 1 generally comprises dielectric material and in a preferred embodiment is of quartz glass. A glass tube of this kind is cut to length by mechanical or thermal means and is provided with a gas inflow opening 2. This opening is embodied in particular as a lateral bore. The discharge tube 1 can be cut to length and drilled by machine; these processes are in principle amenable to automation. No ensuing fusing operation is necessary.

The first connection body E1, connected to anode potential, and the second connection body E2, connected to cathode potential, each surround a discharge tube 1 in the region of a connection point, forming a respective connection chamber K1 and K2, and in this connection region they encompass the discharge tube 1 in a sealing manner. To this end, sealing rings 21 are laid in corresponding annular grooves 22 and 23 of the connection bodies E1 and E2; sealing rings 24 on the end are also laid in annular grooves 25, 26 on the ends of the connection bodies E1, E2; with flange caps, not shown, each produces a gas-tight connection with the ends of the discharge tube 1. The connection neck 3 of a gas inlet line 4 for laser gas is sealingly screwed into a corresponding threaded bore in the connection body E1. On the opposite end of the discharge tube 1, an annular cathode 5 in the form of a tubular sleeve is sealingly inserted into a corresponding axial bore of the connection body E2 and accordingly extends coaxially to the axis x of the discharge tube 1. It can be seen that the gas inflow opening 2 is disposed over an axial portion of the discharge tube 1, or of its jacket, that is located in the interior of the connection chamber K1. The connection body E1 is preferably embodied as a turned metal part, into which a pointed electrode pin 6, preferably comprising a tungsten alloy or chromium-nickel steel, is radially fitted and is soldered in gas-tight fashion. With the electrode pin 6, the gas inflow opening 2 forms a gas inlet aperture. The gas inlet line 4 is located on the side of the connection body E1 opposite the gas inlet opening 2 and discharges radially into the connection chamber K1. The discharge tube 1 is received by the connection body E1 in such a manner that the tip of the electrode pin 6 is in alignment with the center of the gas inlet opening 2 (axis y). The gas inlet opening 2 in the discharge tube 1 cooperates with the electrode pin 6 as a nozzlelike gas inlet, to generate a turbulent flow. The connection body E1 here serves as a holder for the electrode pin 6. The entire connection body E1, including the electrode pin 6, forms an anode body. The potential leads to the connection bodies E1 and E2 are not shown in FIGS. 3 and 4, for the sake of simplification.

What is shown in FIG. 3 (and in FIG. 4) is the embodiment of a gas laser in which one connection body E1 and E2 each is provided on each end of the discharge tube 1, one of them (E1) for the inflow of laser gas and the other (E2) for the outflow of laser gas.

Accordingly, from the left-hand portion of FIG. 3, it can be seen that the electrode pin 6 is inserted into the wall of the connection body E1 in alignment with the axis y of the nozzle opening 2 of the (first) connection body E1 on the gas inlet side, and its tip 6a extends up to a point shortly before or in the wall region of the gas inlet opening 2. The electrode pin 6 acts as an anode pin and is preferably soldered to the connection body E1. In the example of FIG. 3, the tip 6a ends at the outer surface of the discharge tube 1.

Figure 4:
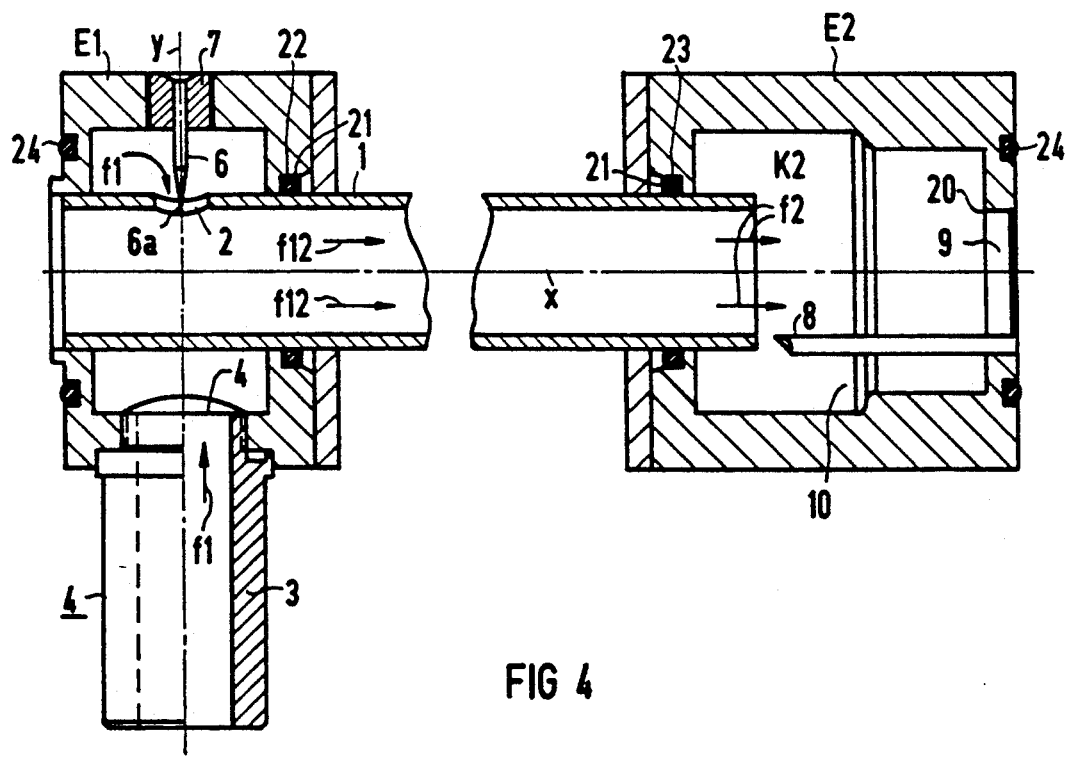
FIG. 4, a second exemplary embodiment, in which the electrode tip in the first connection body is seated in an insert part and protrudes with its tip somewhat farther into the gas inflow opening than in the example of FIG. 3, and in which, instead of an annular cathode of FIG. 3, a cathode pin is provided in the second connection body.

In the second exemplary embodiment of FIG. 4, the electrode pin 6, again embodied as an anode pin, is detachably mounted, so that after the assembly of the discharge tube 1, the electrode pin 6 can be introduced in the direction of the gas inlet opening 2 and secured in such a way that it either ends at the inside surface of the gas inlet opening 2 or even protrudes by a predetermined small amount into the discharge tube 1, as FIG. 4 shows. To this end, the electrode pin 6 is retained adjustably with respect to its insertion depth and in a sealed manner in an insert part 7 of the connection body E1.

On the right-hand side of FIG. 3, it is shown that the second gas connection body E2 toward the gas outlet line is embodied as a cathode body with the aforementioned annular cathode 5. The opposed ends of the discharge tube 1 and annular cathode 5 are disposed inside the connection chamber K2. The annular cathode 5 has a cathode bead 5a. The laser gas leaves the discharge tube via the connection chamber K2 and the annular cathode 5 as indicated by the arrows f2, and via a laser gas outlet line, not shown in FIGS. 3 and 4.

FIG. 4, on the right, shows a variant embodiment of the second connection body E2 having a cathode pin 8 instead of the annular cathode 5. Over the flow path between the discharge tube 1 and the gas outlet conduit 9, the connection chamber K2 is graduated in its diameter; that is, the connection chamber K2 tapers in its inside diameter in the flow direction f2, first in the region 10 of the shoulder and second at the transition 20 to the gas outlet conduit 9. In the example of FIG. 3, the cathode body is formed by the second connection body E2 and the annular cathode 5; in the example of FIG. 4, it is formed by the second connection body E2 and the cathode pin 8.

A third embodiment, in which the connection body E2 of FIG. 3 is replaced by a version of the connection body as shown in FIG. 4, is also possible. The version of the connection body E1 of FIG. 4, having the more deeply inserted electrode pin, can also be associated with the first exemplary embodiment of FIG. 3, instead of the connection body E1 shown there.

In the two exemplary embodiments shown in FIGS. 3 and 4, the laser mirrors that are part of the resonator are not shown, for the sake of simplicity, nor are the high-voltage supply and the hoses for removing and feeding laser gas, and the flange seals and screw fasteners for the connection bodies E1 and E2.

FIG. 5 schematically shows an outline of the entire arrangement of a gas laser in accordance with the invention. A singly folded resonator R can be seen with the two partial resonators R1, R2, which are optically connected in series via the deflection mirror array S1. On one end of the resonator R, that is, at the left-hand end of the lower partial resonator R2, the inverting mirror S2 (100% reflective) is disposed in a corresponding housing; above it, on the left-hand end of the upper partial resonator R1, is the semireflecting mirror S3, which is partly transparent. The output laser beam is marked L. A pedestal of the gas laser is shown in fragmentary form at F. Supported on it is the lower partial resonator R2, and the upper partial resonator R1 is supported on it in turn. For the sake of simplicity, the gas laser is shown with only two partial resonators R1, R2 for its resonator R; it is also possible to compose the resonator R from a total of four partial resonators, which are connected optically in series. In a plan view on the gas laser shown in FIG. 5, two partial resonator pairs located beside one another would then be seen, first the resonator pair R1-R2 shown in FIG. 5 and then a further resonator pair. The view selected in FIG. 5 having only two partial resonators was chosen for the sake of greater clarity.

Each of the two partial resonators R1, R2 has four of the discharge tubes 1 shown in FIGS. 3 and 4, as well as T-pieces 30 between two axially successive second connection bodies E2 and glass tube pieces 31, 31 for optical connection (beam conduction) between the mirror arrays S1, S2, S3 on the one hand and the first connection bodies E1 axially adjacent to them on the other.

In a view from the upper partial resonator R1, the deviation mirror S1 having the two 453 deviation mirrors 32, 33 is followed from right to left in axial succession by the first glass tube piece 31, the first connection body E1, a discharge tube 1, the second connection body E2, a T-piece 30 for gas outflow, a second connection body E2, a discharge tube 1, a first connection body E1 in a twin embodiment, a discharge tube 1, a second connection body E2, a tubular T-piece for gas outflow, a second connection body E2, a discharge tube 1, a first connection body E1, a glass tube piece 31 and the semireflecting mirror S3.

The above-given succession of the various components also applies to the second partial resonator R2, with the exception that instead of the semireflecting mirror S3, an inverting mirror S2 is disposed on its left-hand end. The laser gas is aspirated from the first heat exchanger W1 by the circulation pump and delivered via the second heat exchanger W2 to the first connection bodies E1 via the gas lines on the compression side, which are identified in general by D. The first connection bodies E1 of the first partial resonator R1 receive their fresh laser gas via the branch lines on the compression side D12, D14, D13 and D11 (looking from left to right). These branch lines are connected to the common gas inlet line D1 on the compression side. The first connection bodies E1 of the second (lower) partial resonator R2 receive their fresh laser gas (looking from left to right) via the branch lines D22, D24, D23 and D21 toward the compression side. These four branch lines are connected to the outlet of the second heat exchanger W2, as is the common gas inlet line D1.

After flowing through the discharge tubes 1, the laser gas is removed again via the respective second connection bodies E2 and the associated T-pieces 30, with the four T-pieces 30 discharging in pairs, each pair into one outlet line (via connection line segments, not shown in detail); these two outlet lines are shown as A1 and A2 and both discharge into the inlet side of the first heat exchanger W1, the outlet side of which is connected to the suction side of the circulation pump P1.

All the first connection bodies E1 are connected to the anode potential (+) of a schematically represented high-voltage source HS; all the second connection bodies E2 are connected to the cathode potential (−), and the potential difference or voltage of the direct-current high-voltage source HS is 30 kV, for instance. For the sake of greater clarity, the potential connection is shown only for the two first and second connection bodies E1, E2 on the right in FIG. 5.

To maintain the desired pressure in the resonator R, there is a vacuum pump 35 with a regulating valve 36. Fresh gas can be supplied at 34.

As can be seen, the advantageous embodiment of the first connection body E1, in combination with the second connection bodies E2, has an eight-fold effect in the singly folded resonator R shown in FIG. 5, and correspondingly a 16-fold effect in a triply folded resonator R having four partial resonators.

We claim:

1. An axial flow gas laser, comprising a discharge tube of dielectric material defining a gas chamber and having a given longitudinal axis, first and second connection bodies sealingly connected with said discharge tube and forming respective first and second connection chambers, a connection neck sealingly communicating with said first connection chamber and said connection neck defining a predetermined longitudinal axis, said connection bodies forming electrical and laser gas connection points in the region of said connection chambers, laser gas inlet and laser gas outlet lines communicating with said first and second connection chambers, said first connection body being connected to the anode potential of a direct voltage source and said second connection body being connected to the cathode potential of the direct voltage source, said first and second connection bodies being mutually spaced apart along said given axis, said gas chamber of said discharge tube defining a discharge path between the anode and cathode potentials, a gas inflow opening disposed on said discharge tube and communicating with said first connection chamber of said first connection body, an electrode pin having a tip inserted into said first connection body, and said tip extending at least into the vicinity of said gas inflow opening, and said electrode pin being disposed substantially coaxially with said predetermined axis.

2. The gas laser according to claim 1, wherein said laser gas inlet line discharges into said first connection chamber at a location of said first connection chamber disposed opposite said gas inflow opening.

3. The gas laser according to claim 1, wherein said first connection body is metal electrode body.

4. The gas laser according to claim 1, wherein said first connection body is a turned part.

5. An axial flow gas laser, comprising a discharge tube of dielectric material defining a gas chamber and having a given longitudinal axis, first and second connection bodies sealingly connected with said discharge tube and forming respective first and second connection chambers, a connection neck sealingly communicating with said first connection chamber, said connection bodies forming electrical and laser gas connection points in the region of said connection chambers, laser gas inlet and laser gas outlet lines communicating with said first and second connection chambers, said first connection body being connected to the anode potential of a direct voltage source and said second connection body being connected to the cathode potential of the direct voltage source, said first and second connection bodies being mutually spaced apart along said given axis, said gas chamber of said discharge tube defining a discharge path between the anode and cathode potentials, a gas inflow opening disposed on said discharge tube and communicating with said first connection chamber of said first connection body, an electrode pin having a tip inserted into said first connection body, and said tip extending at least into the vicinity of said gas inflow opening, and including means for sealingly inserting said electrode pin in said first connection body and means for adjusting the distance between said electrode tip and said gas inflow opening.

6. The gas laser according to claim 5, wherein said means are in the form of an insert part.

7. The gas laser according to claim 1, wherein said electrode pin is moveable along said predetermined axis.

8. An axial flow gas laser, comprising a discharge tube of dielectric material defining a gas chamber and having a given longitudinal axis, first and second connection bodies sealingly connected with said discharge tube and forming respective first and second connection chambers, a connection neck sealingly communicating with said first connection chamber, said connection bodies forming electrical and laser gas connection points in the region of said connection chambers, laser gas inlet and laser gas outlet lines communicating with said first and second connection chambers, said first connection body being connected to the anode potential of a direct voltage source and said second connection body being connected to the cathode potential of the direct voltage source, said first and second connection bodies being mutually spaced apart along said given axis, said gas chamber of said discharge tube defining a discharge path between the anode and cathode potentials, a gas inflow opening disposed on said discharge tube and communicating with said first connection chamber of said first connection body, an electrode pin having a tip inserted into said first connection body, and said tip extending at least into the vicinity of said gas inflow opening, and wherein said discharge tube has an open end discharging into said second connection chamber, and including an annular cathode disposed in said second connection body substantially coaxially with said given axis, said annular cathode and said open end being mutually spaced apart along said given axis.

9. An axial flow gas laser, comprising a discharge tube of dielectric material defining a gas chamber and having a given longitudinal axis, first and second connection bodies sealingly connected with said discharge tube and forming respective first and second connection chambers, a connection neck sealingly communicating with said first connection chamber, said connection bodies forming electrical and laser gas connection points in the region of said connection chambers, laser gas inlet and laser gas outlet lines communicating with said first and second connection chambers, said first connection body being connected to the anode potential of a direct voltage source and said second connection body being connected to the cathode potential of the direct voltage source, said first and second connection bodies being mutually spaced apart along said given axis, said gas chamber of said discharge tube defining a discharge path between the anode and cathode potentials, a gas inflow opening disposed on said discharge tube and communicating with said first connection chamber of said first connection body, an electrode pin having a tip inserted into said first connection body, and said tip extending at least into the vicinity of said gas inflow opening, and wherein said discharge tube has an open end discharging into said second connection chamber and said connection chamber has a gas outlet conduit, and including a cathode pin extending parallel to said given axis inside said second connection chamber into the vicinity of said open end, the diameter of said second connection chamber being reduced in a stepwise fashion in a direction from said open end towards said gas outlet conduit.

* * * * *